United States Patent
Kleefisch et al.

(10) Patent No.: US 6,293,978 B2
(45) Date of Patent: Sep. 25, 2001

(54) PROCESS FOR CONVERTING ORGANIC COMPOUNDS USING COMPOSITE MATERIALS IN MEMBRANE REACTORS

(75) Inventors: Mark S. Kleefisch, Plainfield; Carl A. Udovich, Joliet; Joseph G. Masin, St. Charles, all of IL (US); Thaddeus P. Kobylinski, Prospect, PA (US)

(73) Assignee: BP Corporation North America Inc., Chicago, IL (US)

( * ) Notice: Subject to any disclaimer, the term of this patent is extended or adjusted under 35 U.S.C. 154(b) by 0 days.

(21) Appl. No.: 09/757,412

(22) Filed: Jan. 9, 2001

Related U.S. Application Data

(60) Division of application No. 09/306,945, filed on May 7, 1999, now Pat. No. 6,200,541, which is a continuation-in-part of application No. 08/958,574, filed on Oct. 28, 1997, now Pat. No. 5,935,533.

(51) Int. Cl.[7] ............................................. C01B 3/40
(52) U.S. Cl. ............... 48/198.2; 48/DIG. 5; 422/211; 422/239; 422/240; 423/651; 423/656; 502/4; 502/525
(58) Field of Search .................. 502/4, 525; 422/211, 422/222, 236, 239, 240, 312; 423/648.1, 650, 651, 656; 48/198.2, 198.5, DIG. 5

(56) References Cited

U.S. PATENT DOCUMENTS

| | | | |
|---|---|---|---|
| 5,306,411 | * | 4/1994 | Mazanec et al. ............... 204/265 |
| 5,332,597 | * | 7/1994 | Carolan et al. ................. 427/243 |
| 5,360,635 | * | 11/1994 | Richards et al. ............... 427/243 |
| 5,573,737 | * | 11/1996 | Balachandran et al. ......... 422/211 |
| 5,580,497 | * | 12/1996 | Balachandran et al. ........ 252/519.1 |
| 5,599,383 | * | 2/1997 | Dyer et al. ..................... 96/8 |
| 5,935,533 | * | 8/1999 | Kleefisch et al. ............... 422/211 |
| 6,200,541 | * | 3/2001 | Kleefisch et al. ............... 422/211 |

OTHER PUBLICATIONS

Encyclopedia of Material Science and Engineering, vol. 4, pp. 2463–2475, Bever, M.B. Ed., Pergamon Press, 1986.*

Shin et al., Mat. Res. Bull. 13, pp. 1017–1021, 1978.*

* cited by examiner

Primary Examiner—Hien Tran
Assistant Examiner—Basia A Ridley
(74) Attorney, Agent, or Firm—Thomas A. Yassen

(57) ABSTRACT

A process for converting organic compounds using composite materials in membrane reactors. The composite materials include a gas-tight ceramic, a porous metallic support, and an interfacial zone therebetween eliminate the need for mechanical seals between two such dissimilar materials. Oxygen ion-conducting dense ceramic membranes are formed on a porous metallic alloy to provide an interfacial zone identifiable by a gradient of composition in at least one metallic element across the interfacial zone between the dense ceramic membrane and the porous support. Processes using composite materials in accordance with the invention are, for example, used for production of synthesis gas comprising carbon monoxide and molecular hydrogen, whereby the synthesis gas is, advantageously, free of deleterious and/or inert gaseous diluents such as nitrogen.

17 Claims, 3 Drawing Sheets

PROCESS FOR CONVERTING ORGANIC COMPOUNDS USING COMPOSITE MATERIALS IN MEMBRANE REACTORS

CROSS-REFERENCE TO RELATED APPLICATION

This application is a divisional of copending nonprovisional Application No. 09/306,945, filed on May 7, 1999, now U.S. Pat. No. 6,200,541, which is a continuation-in-part of copending nonprovisional Application No. 08/958,574, filed on Oct. 28, 1997, now U.S. Pat. No. 5,935,533.

FIELD OF THE INVENTION

The present invention relates to composite materials for membrane reactors which include a gas-tight ceramic, a porous support, and an interfacial zone therebetween. More particularly, this invention relates to composite materials using oxygen ion-conducting dense ceramic membranes formed on a porous support comprising a metallic alloy to provide an interfacial zone of chemical interaction between the dense ceramic membrane and the porous support. Typically, chemical interactions are identifiable by a gradient of composition in at least one metallic element across the interfacial zone between the dense ceramic membrane and the porous support. Chemical interactions preferably match thermal expansion coefficients and other physical properties between the two different materials.

Processes using composite materials in accordance with the invention include converting methane gas into value-added-products, for example, production of synthesis gas comprising carbon monoxide and molecular hydrogen in which the synthesis gas advantageously is free of deleterious and/or inert gaseous diluents such as nitrogen.

BACKGROUND OF THE INVENTION

Conversion of low molecular weight alkanes, such as methane, to synthetic fuels or chemicals has received increasing attention as low molecular weight alkanes are generally available from secure and reliable sources. For example, natural gas wells and oil wells currently produce vast quantities of methane. In addition, low molecular weight alkanes are generally present in coal deposits and may be formed during mining operations, in petroleum processes, and in the gasification or liquefaction of coal, tar sands, oil shale, and biomass.

Many of these alkane sources are located in relatively remote areas, far from potential users. Accessibility is a major obstacle to effective and extensive use of remotely situated methane, ethane and natural gas. Costs associated with liquefying natural gas by compression or, alternatively, constructing and maintaining pipelines to transport natural gas to users are often prohibitive. Consequently, methods for converting low molecular weight alkanes to more easily transportable liquid fuels and chemical feedstocks are desired and a number of such methods have been reported.

Reported methods can be conveniently categorized as direct oxidation routes and/or as indirect syngas routes. Direct oxidative routes convert lower alkanes to products such as methanol, gasoline, and relatively higher molecular weight alkanes. In contrast, indirect syngas routes involve, typically, production of synthesis gas as an intermediate product.

As is well known in the art, synthesis gas ("syngas") is a mixture of carbon monoxide and molecular hydrogen, generally having a dihydrogen to carbon monoxide molar ratio in the range of 1:5 to 5:1, and which may contain other gases such as carbon dioxide. Synthesis gas has utility as a feedstock for conversion to alcohols, olefins, or saturated hydrocarbons (paraffins) according to the well known Fischer-Tropsch process, and by other means. Synthesis gas is not a commodity; rather, it is typically generated on-site for further processing. At a few sites, synthesis gas is generated by a supplier and sold "over the fence" for further processing to value added products. One potential use for synthesis gas is as a feedstock for conversion to high molecular weight (e.g. $C_{50+}$) paraffins which provide an ideal feedstock for hydrocracking for conversion to high quality jet fuel and superior high cetane value diesel fuel blending components. Another potential application of synthesis gas is for large scale conversion to methanol.

In order to produce high molecular weight paraffins in preference to lower molecular weight (e.g. $C_8$ to $C_{12}$) linear paraffins, or to synthesize methanol it is desirable to utilize a synthesis gas feedstock having an $H_2$:CO molar ratio of about 2.1:1, 1.9:1, or less. As is well known in the art, Fischer-Tropsch syngas conversion reactions using syngas having relatively high $H_2$:CO ratios produce hydrocarbon products with relatively large amounts of methane and relatively low carbon numbers. For example, with an $H_2$:CO ratio of about 3, relatively large amounts of C1–C8 linear paraffins are typically produced. These materials are characterized by very low octane value and high Reid vapor pressure, and are highly undesirable for use as gasoline.

Lowering the $H_2$:CO molar ratio alters product selectivity by increasing the average number of carbon atoms per molecule of product, and decreasing the amount of methane and light paraffins produced. Thus, it is desirable for a number of reasons to generate syngas feedstocks having molar ratios of hydrogen to carbon monoxide of about 2:1 or less.

Prior methods for producing synthesis gas from natural gas (typically referred to as "natural gas reforming") can be categorized as (a) those relying on steam reforming where natural gas is reacted at high temperature with steam, (b) those relying on partial oxidation in which methane is partially oxidized with pure oxygen by catalytic or non-catalytic means, and (c) combined cycle reforming consisting of both steam reforming and partial oxidation steps.

Steam reforming involves the high temperature reaction of methane and steam over a catalyst to produce carbon monoxide and hydrogen. This process, however, results in production of syngas having a high ratio of hydrogen to carbon monoxide, usually in excess of 3:1.

Partial oxidation of methane with pure oxygen provides a product which has an $H_2$:CO ratio close to 2:1, but large amounts of carbon dioxide and carbon are co-produced, and pure oxygen is an expensive oxidant. An expensive air separation step is required in combined cycle reforming systems, although such processes do result in some capital savings since the size of the steam reforming reactor is reduced in comparison to a straightforward steam reforming process.

Although direct partial oxidation of methane using air as a source of oxygen is a potential alternative to today's commercial steam-reforming processes, downstream processing requirements cannot tolerate nitrogen (recycling with cryogenic separations is required), and pure oxygen must be used. The most significant cost associated with partial oxidation is that of the oxygen plant. Any new process that could use air as the feed oxidant and thus avoid the problems of recycling and cryogenic separation of nitrogen from the product stream will have a dominant economical impact on the cost of a syngas plant, which will be reflected in savings of capital and separation costs.

Thus, it is desirable to lower the cost of syngas production as by, for example, reducing the cost of the oxygen plant, including eliminating the cryogenic air separation plant, while improving the yield as by minimizing the co-production of carbon, carbon dioxide and water, in order to best utilize the product for a variety of downstream applications.

Dense ceramic membranes represent a class of materials that offer potential solutions to the above-mentioned problems associated with natural gas conversion. Certain ceramic materials exhibit both electronic and ionic conductivities (of particular interest is oxygen ion conductivity). These materials not only transport oxygen (functioning as selective oxygen separators), but also transport electrons back from the catalytic side of the reactor to the oxygen-reduction interface. As such, no external electrodes are required, and if the driving potential of transport is sufficient, the partial oxidation reactions should be spontaneous. Such a system will operate without the need of an externally applied electrical potential. Although there are recent reports of various ceramic materials that could be used as partial oxidation ceramic membrane, little work appears to have been focused on the problems associated with the stability of the material under methane conversion reaction conditions.

European Patent Application 90305684.4, published on Nov. 28, 1990, under Publication No. EP 0 399 833 A1 in the name of Cable et al., describes an electrochemical reactor using solid membranes comprising: (1) a multi-phase mixture of an electronically-conductive material, (2) an oxygen ion-conductive material, and/or (3) a mixed metal oxide of a perovskite structure. Reactors are described in which oxygen from oxygen-containing gas is transported through a membrane disk to any gas that consumes oxygen. Flow of gases on each side of the membrane disk in the reactor shell shown are symmetrical flows across the disk, substantially radial outward from the center of the disk toward the wall of a cylindrical reactor shell. The gases on each side of the disk flow parallel to, and co-current with, each other.

Materials known as "perovskites" are a class of materials which have an X-ray identifiable crystalline structure based upon the structure of the mineral perovskite, $CaTiO_3$. In its idealized form, the perovskite structure has a cubic lattice in which a unit cell contains metal ions at the corners of the cell, another metal ion in its center and oxygen ions at the midpoints of each cube edge. This cubic lattice is identified as an $ABO_3$-type structure where A and B represent metal ions. In the idealized form of perovskite structures, generally, it is required that the sum of the valences of A ions and B ions equal 6, as in the model perovskite mineral, $CaTiO_3$.

A variety of substitutions of the A and B cations can occur. Replacing part of a divalent cation by a trivalent cation or a pentavalent ion for a tetravalent ion, i.e., donor dopant, results in two types of charge compensation, namely, electronic and ionic, depending on the partial pressure of oxygen in equilibrium with the oxides. The charge compensation in acceptor-doped oxides, i.e., substituting a divalent cation for a trivalent cation is, by electronic holes, at high oxygen pressures, but at low pressures, it is by oxygen ion vacancies. Ion vacancies are the pathway for oxide ions. Therefore, the oxygen flux can be increased by increasing the amount of substitution of lower valence element for a higher valence metal ion. The reported oxygen flux values in perovskites tend to follow the trends suggested by the charge compensation theory. While the primary property of high oxygen flux appears to be feasible in a few combination of dopants in $ABO_3$ type oxides, many other questions need to be answered about the ideal material for constructing a novel membrane reactor. For example, the mechanical properties of the chosen membrane must have the strength to maintain integrity at the conditions of reaction. It must also maintain chemical stability for long periods of time at the reaction conditions. The oxygen flux, chemical stability, and mechanical properties depend on the stoichiometry of the ceramic membrane.

Many materials having the perovskite-type structure ($ABO_3$-type) have been described in recent publications including a wide variety of multiple cation substitutions on both the A and B sites as being stable in the perovskite structure. Likewise, a variety of more complex perovskite compounds containing a mixture of A metal ions and B metal ions (in addition to oxygen) are reported. Publications relating to perovskites include: P. D. Battle et al., J. Solid State Chem., 76, 334 (1988); Y. Takeda et al., Z. Anorg. Allg. Chem., 550/541, 259 (1986); Y. Teraoka et al., Chem. Lett., 19, 1743 (1985); M. Harder and H. H. Muller-Buschbaum, Z. Anorg. Allg. Chem., 464, 169 (1980); C. Greaves et al., Acta Cryst., B31, 641 (1975).

For example, Hayakawa et al. U.S. Pat. No. 5,126,499, incorporated by reference herein, describes a process for the production of hydrocarbons by oxidative coupling of methane using a perovskite-type oxide having the following composition:

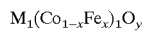

$$M_1(Co_{1-x}Fe_x)_1O_y$$

where M stands for at least one alkaline earth metal, x is a number greater than 0, but not greater than 1, and y is a number in the range of 2.5–3.5 at a temperature of 500° to 1000° C.

Commonly assigned U.S. Pat. Nos. 5,580,497 and 5,639,437 in the names of Uthamalingam Balachandran, Mark S. Kleefisch, Thaddeus P. Kobylinski, Sherry L. Morissette and Shiyou Pei, incorporated by reference herein, discloses preparation, structure and properties of a class of mixed metal oxide compositions of at least strontium, cobalt, iron and oxygen, and is incorporated herein by reference in its entirety. Use of the mixed metal oxides in dense ceramic membranes having electron conductivity and oxygen ion conductivity, are described as well as their use in separation of oxygen from an oxygen-containing gaseous mixture to form an oxygen-depleted first product and optionally reacting recovered oxygen with organic compounds in another gaseous mixture.

Ceramic powders with varying stoichiometry are made by solid-state reaction of the constituent carbonates and nitrates. Appropriate amounts of reactants are, generally, mixed and milled in methanol using zirconia media for several hours. After drying, the mixtures are calcined in air at elevated temperatures, e.g., up to about 850° C. for several hours, typically, with an intermittent grinding. After the final calcination, the powder is ground to small particle size. The morphology and particle size distribution can play a significant role during the fabrication of membrane tubes.

Membrane tubes can be conveniently fabricated by known methods of plastic extrusion. To prepare for extrusion, ceramic powder is, generally, mixed with several organic additives to make a formulation with enough plasticity to be easily formed into various shapes while retaining satisfactory strength in the green state. This formulation, known as a slip, consists in general of a solvent, a dispersant, a binder, a plasticizer, and ceramic powder. The role of each additive is described in Balachandran et al., *Proceedings International Gas Research Conference*, Orlando, Fla. (H. A. Thompson editor, Government Institutes, Rockville, Md.), pp. 565–573 (1992). Ratios of the various constituents of a slip vary, depending on the forming process and such characteristics of the ceramic powder as particle size and specific surface area. After the slip is prepared, some of the solvent is allowed to evaporate; this yields a plastic mass that is forced through a die at high pressure (about 20 MPa) to produce hollow tubes. Tubes have been extruded with outside diameters of about −6.5 mm and lengths up to about 30 cm. The wall thicknesses are in the range 0.25 to 1.20 mm. In the green state (i.e., before firing), extruded tubes exhibit great flexibility.

Extruded tubes are heated at a slow heating rate (5° C./h) in the temperature range 150° to 400° C. to facilitate removal of gaseous species formed during decomposition of organic additives. After the organics are removed at low temperatures, the heating rate is increased to about 60° C./h and the tubes are sintered at about 1200° C. for 5 to 10 h. All the heatings are done in stagnant air. Performance characteristics of the membranes depend on the stoichiometry of the cations in the ceramic.

In commonly assigned U.S. Pat. No. 5,573,737 to Uthamalingam Balachandran, Joseph T. Dundek, Mark S. Kleefisch and Thaddeus P. Kobylinski, a functionally gradient material is described as including an outer tube of perovskite, which contacts air, an inner tube of zirconium oxide which contacts methane gas, and a bonding layer between the perovskite and zirconium oxide layers.

Even though the functionally gradient oxide materials disclosed in U.S. Pat. No. 5,573,737 exhibit greater stability than other known compositions, there are, under some conditions, certain problems associated with them in the form of unsupported reactor tubes. The reactor tubes can fracture at regions slightly away from the hot reaction zone where temperatures of the tube can, e.g., drop from about 800° C. to about 700° C. in the failure regions.

Accordingly, it is an object of the present invention to provide stable composite materials for membrane reactors which include a gas-tight ceramic having a composition which exhibits both ionic and electronic conductivity as well as appreciable oxygen permeability.

It is another object of the present invention to provide stable composite materials for membrane reactors useful in converting low hydrocarbons to high value products which exhibit greater stability when exposed to a reducing gas environment and other operating conditions for extended time periods.

It is an object of the invention to overcome one or more of the problems described above.

Other objects and advantages of the invention will be apparent to those skilled in the art from a review of the following detailed description, taken in conjunction with the drawing and the appended claims.

Other objects and advantages of the invention will become apparent upon reading the following detailed description and appended claims.

SUMMARY OF THE INVENTION

In broad aspect, the present invention is directed to composite materials for membrane reactors which include a gas-tight ceramic, a porous support, and an interfacial zone therebetween. More particularly, this invention relates to composite materials using oxygen ion-conducting dense ceramic membranes formed on a porous support comprising a metallic alloy to provide an interfacial zone of chemical interaction between the dense ceramic membrane and the porous support. Advantageously, such composite materials are used for membrane reactors converting, for example, natural gas to synthesis gas by controlled partial oxidation and reforming reactions, and when desired, subsequent conversion of the synthesis gas to added-value products, for example, by a water-gas shift process.

In one aspect, the invention is a composite material for membrane reactors, which composite material comprises: (i) a dense ceramic membrane comprising a crystalline mixed metal oxide which exhibits, at operating temperatures, electron conductivity, oxygen ion conductivity, and ability to separate oxygen from a gaseous mixture containing oxygen and one or more other components by means of the conductivities; (ii) a porous support comprising an alloy of at least two metallic elements which exhibits mechanical stability at operating temperature; and (iii) an interfacial zone of at least about 5 $\mu$m exhibiting chemical interaction between the dense ceramic membrane and the porous support.

Preferably, the dense ceramic membrane in the composite is made from a mixed metal oxide in a particulate form by spraying particulate oxide at elevated temperatures against the porous support, whereby the chemical interaction defining the interfacial zone is obtained.

In another preferred embodiment, the dense ceramic membrane in the tube module is made from a mixed metal oxide in a particulate form compressing particulate oxide at temperatures in a range from about 500° C. to about 1250° C. against the inner and outer porous tubes, whereby the gradients of composition defining the first and second interfacial zones are obtained.

In yet another aspect, the invention is a process to convert organic compounds into value-added products, which composite material comprises by: providing a membrane reactor comprising a plurality of the hollow tube module described herein above; contacting the outer porous tube of the hollow tube module with an oxygen-containing gaseous mixture having a relatively higher oxygen partial pressure; contacting the inner porous tube of the hollow tube module with a gaseous composition having a relatively lower oxygen partial pressure and; permitting oxygen to be transported through the dense ceramic membrane by means of its electron conductivity and oxygen ion conductivity, thereby separating oxygen from the oxygen-containing gaseous mixture having a relatively higher oxygen partial pressure into the gaseous composition having a relatively lower oxygen partial pressure.

In preferred embodiments of the invention, the crystalline mixed metal oxide composition is selected from a class of materials which have an X-ray identifiable crystalline structure based upon the structure of the mineral perovskite, $CaTiO_3$.

In other preferred embodiments of the invention, the crystalline mixed metal oxide composition is selected from a class of materials represented by $$D_\alpha E_{\alpha+\beta} O_\delta$$

where D comprises at least one metal selected from the group consisting of magnesium, calcium, strontium, and barium, E comprises at least one element selected from the group consisting of vanadium, chromium, manganese, iron, cobalt, and nickel, $\alpha$ is a number in a range from about 1 to about 4, β is a number in a range from about 0.1 to about 20, such that $$1.1 < (\alpha+\beta)/\alpha \leq 6,$$

and δ is a number which renders the compound charge neutral, wherein the crystalline mixed metal oxide composition has a crystalline structure comprising layers having a perovskite structure held apart by bridging layers having a different structure identifiable by means of powder X-ray diffraction pattern analysis, the composition such that a dense ceramic membrane comprising the composition exhibits electron conductivity and oxygen ion conductivity, and ability to separate oxygen from a gaseous mixture containing oxygen and one or more other volatile components by means of the conductivities.

The invention also includes use of the composite materials in membrane reactors for separation of oxygen from an oxygen-containing gaseous mixture. Typically, in such processes the aforesaid composite materials are used in separation apparatus for transfer of oxygen from an oxygen-containing first gaseous mixture having a relatively higher oxygen partial pressure to a second gaseous mixture having a relatively lower oxygen partial pressure and preferably containing one or more components, more preferably including organic compounds which react with oxygen. An essential feature of such selectively permeable dense ceramic membrane of the composite materials is that it retains its ability to separate oxygen for an adequate period of time at the conditions of operation.

The present invention relates, also, to preparation, structure, and properties of dense ceramic membranes comprising mixed metal oxide compositions which exhibit electron conductivity and oxygen ion conductivity, and ability to separate oxygen selectively from a gaseous mixture containing oxygen and one or more other volatile components by means of the conductivities. An essential feature of such selectively permeable material is that it retain its ability to separate and transport oxygen for an adequate period of time.

BRIEF DESCRIPTION OF THE DRAWING

The appended claims set forth those novel features which characterize the present invention. The present invention itself, as well as advantages thereof, may best be understood, however, by reference to the following brief description of preferred embodiments taken in conjunction with the annexed drawings, in which:

Figure 1:
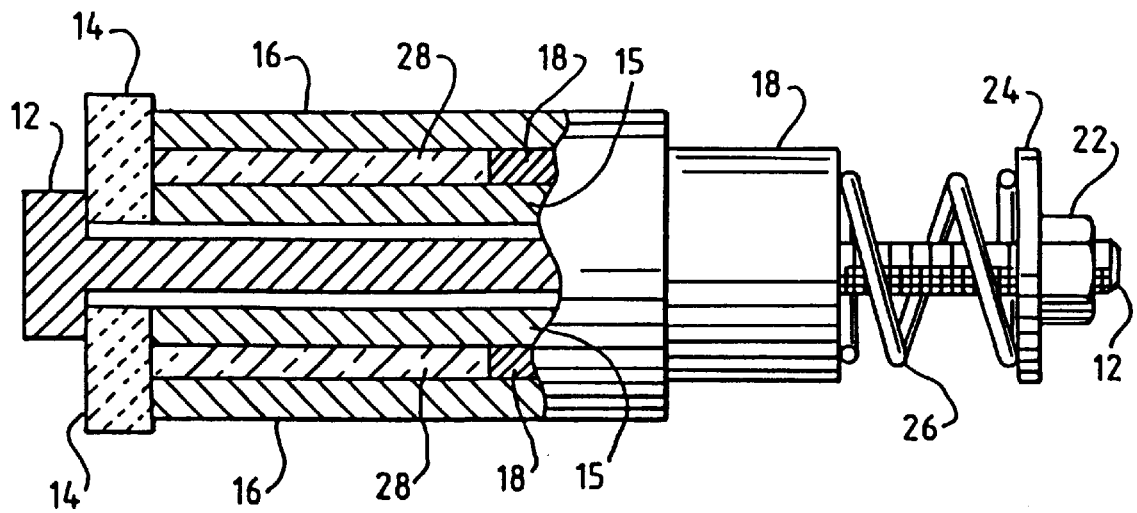
FIG. 1 is a longitudinal view, in partial section, depicting apparatus for demonstrating aspects of a hollow tube module for membrane reactors using composite material comprising oxygen ion-conducting dense ceramic according to the present invention.

For a more complete understanding of the present invention, reference should now be made to the embodiments illustrated in greater detail in the accompanying drawing and described below by way of examples of the invention.

BRIEF DESCRIPTION OF THE INVENTION

As stated previously, dense ceramic membranes useful in accordance with this invention comprises a crystalline mixed metal oxide which exhibits, at operating temperatures, electron conductivity, oxygen ion conductivity and ability to separate oxygen from a gaseous mixture containing oxygen and one or more other volatile components by means of the conductivities.

A preferred class of oxygen ion-conducting dense ceramic materials is disclosed in commonly assigned U.S. Pat. Nos.: 5,580,497; 5,639,437 and 5,853,565 to Balachandran, Kleefisch, Kobylinski, Morissette and Pei, which patents are specifically incorporated herein in their entirety by reference.

Particularly useful crystalline mixed metal oxide compositions are selected from a class of materials represented by

where D comprises at least one metal selected from the group consisting of magnesium, calcium, strontium, and barium, E comprises at least one element selected from the group consisting of vanadium, chromium, manganese, iron, cobalt, and nickel, α is a number in a range from about 1 to about 4, β is a number in a range upward from 0.1 to about 20, such that $$1.1 < (\alpha+\beta)/\alpha \leq 6,$$

and δ is a number which renders the compound charge neutral.

Dense ceramic membranes used in accordance with this invention advantageously and preferably comprise a crystalline mixed metal oxide composition which has a crystalline structure comprising layers having a perovskite structure held apart by bridging layers having a different structure identifiable by means of powder X-ray diffraction pattern analysis. Such dense ceramic membranes exhibit electron conductivity and oxygen ion conductivity, and ability to separate oxygen from a gaseous mixture containing oxygen and one or more other volatile components by means of the conductivities.

Useful dense ceramic membranes advantageously comprise the crystalline mixed metal oxide composition represented by

where D is a metal selected from the group consisting of magnesium, calcium, strontium, and barium, M' is a metal selected from the group consisting of magnesium, calcium, strontium, barium, copper, zinc, silver, cadmium, gold, and mercury, E is an element selected from the group consisting of vanadium, chromium, manganese, iron, cobalt, and nickel, G is an element selected from the group consisting of vanadium, chromium, manganese, iron, cobalt, nickel, niobium, molybdenum, technetium, ruthenium, rhodium, palladium, indium, tin, antimony, rhenium, lead, and bismuth, with the proviso that D, E, G and M' are different elements, y is a number in a range from about 0.1 to about 0.5, x is a number in a range from about 0.1 to about 0.8, α is a number in a range from about 1 to about 4, β is a number in a range from 0.1 to about 20, preferably a number in a range from about 0.1 to about 6, such that $$1.1 < (\alpha+\beta)/\alpha \leq 6,$$

and δ is a number which renders the compound charge neutral.

In preferred embodiments of the invention, the crystalline mixed metal oxide composition is represented by $$Sr_\alpha(Fe_{1-x}Co_x)_{\alpha+\beta}O_\delta$$

where x is a number in a range from 0.01 to about 1, α is a number in a range from about 1 to about 4, β is a number in a range from about 0.1 to about 20, such that $$1<(\alpha+\beta)/\alpha\leq6,$$

and δ is a number which renders the compound charge neutral, and wherein the crystalline mixed metal oxide composition has a crystalline structure comprising layers having a perovskite structure held apart by bridging layers having a different structure identifiable by means of powder X-ray diffraction pattern analysis, the composition being such that a dense ceramic membrane comprising the composition exhibits electron conductivity and oxygen ion conductivity, and ability to separate oxygen from a gaseous mixture containing oxygen and one or more other volatile components by means of the conductivities.

In other preferred aspects of the invention, the crystalline mixed metal oxide composition is represented by $$(Sr_{1-y}M_y)_\alpha(Fe_{1-x}Co_x)_{\alpha+\beta}O_\delta$$

where M is an element selected from the group consisting of yttrium, barium, and lanthanum, X is a number in a range from about 0.01 to about 0.95, preferably X is a number in a range from 0.1 to 0.8, Y is a number in a range from about 0.01 to about 0.95, preferably Y is a number in a range upward from 0.1 to about 0.5, α is a number in a range from about 1 to about 4, β is a number in a range from about 0.1 to about 20, preferably β is a number in a range from about 0.1 to about 6, such that $$1.1<(\alpha+\beta)/\alpha\leq6,$$

and δ is a number which renders the compound charge neutral.

In yet other preferred aspects of the invention, the crystalline mixed metal oxide composition is represented by $$Sr\ Fe\ Co_{0.5}\ O_\delta$$

where δ is a number which renders the compound charge neutral, and wherein the composition has a powder X-ray diffraction pattern comprising significant lines substantially as described in Table I.

TABLE I

Principal XRD Lines

| Interplanar Spacing d, Å[1] | Assigned Strength |
|---|---|
| 9.52 ± .05 | Weak |
| 3.17 ± .05 | Weak |
| 2.77 ± .05 | Medium–Strong |
| 2.76 ± .05 | Medium–Strong |
| 2.73 ± .03 | Very Strong |
| 2.08 ± .03 | Weak–Medium |
| 1.96 ± .02 | Medium |
| 1.90 ± .02 | Weak–Medium |
| 1.592 ± .01 | Weak–Medium |
| 1.587 ± .01 | Medium |
| 1.566 ± .01 | Weak |

[1]Angstroms

As is generally known, the assigned strengths in X-ray diffraction patterns may vary depending upon the characteristics of the sample. The observed line strength in any particular sample may vary from another sample, for example, depending upon the amounts of each crystalline phase, oxygen content, and/or amorphous material in a sample. Also, X-ray diffraction lines of a particular crystalline material may be obscured by lines from other materials present in a measured sample.

Useful crystalline mixed metal oxide compositions can, also, be selected from a class of materials known, generally, as perovskites which have an X-ray identifiable crystalline structure based upon the structure of the mineral perovskite, $CaTiO_3$. In its idealized form, the perovskite structure has a cubic lattice in which a unit cell contains metal ions at the corners of the cell, another metal ion in its center and oxygen ions at the midpoints of each cube edge. This cubic lattice is identified as an $ABO_3$-type structure where A and B represent metal ions. In the idealized form of perovskite structures it is required that the sum of the valences of A ions and B ions equal 6, as in the model perovskite mineral, $CaTiO_3$.

Preferred membranes include an inorganic crystalline material comprising strontium, iron, cobalt and oxygen, preferably having a powder X-ray diffraction pattern comprising significant lines substantially as described in Table I. Advantageously the crystalline mixed metal oxide demonstrates oxygen ionic conductivity and electronic conductivity. The invention includes method of preparation for the crystalline mixed metal oxide compositions containing at least strontium, cobalt, iron and oxygen.

As mentioned above, the mixed metal oxide materials useful in dense ceramic membranes of this invention include any single phase and/or multi-phase, dense phase, intimate mixture of materials which has electron conductivity and oxygen ion conductivity. In relation to the solid metal oxide materials, the terms "mixture" and "mixtures" include materials comprised of two or more solid phases and single-phase materials in which atoms of the included elements are intermingled in the same solid phase, such as in the yttria-stabilized zirconia. The term "multi-phase" refers to a material which contains two or more solid phases interspersed without forming a single phase solution. Useful core material, therefore, includes the multi-phase mixture which is "multi-phase" because the electronically-conductive material and the oxygen ion-conductive material are present as at least two solid phases, such that atoms of the various components of the multi-component solid are, primarily, not intermingled in the same solid phase.

Useful multi-phase solid core materials are described in European Patent Application number 90305684.4, published on Nov. 28, 1990, under Publication No. EP 0 399 833 A1 the disclosure of which is hereby incorporated herein by reference.

In the indirect method for making a dense ceramic membrane containing a mixed metal oxide material having crystalline structure according to the invention, a solid oxide is made and commuted to a powder, the powder is blended into a plastic mass with solvent liquid and optional additives, a desired shape is formed from the plastic mass, and the shape heated to temperatures sufficient to form a dense and solid ceramic having electron conductivity and oxygen ion conductivity. Typically, such ceramics are obtained at temperatures in a range upward from about 500° C., and generally at temperatures in a range upward from about 800° C.

Porous supports for use according to this invention can be made of any suitable alloy which exhibits mechanical stability at operating temperature. Particularly useful are alloys, such as nickel-base steel alloys. Suitable alloys advantageously and preferably have coefficients of expansion matching that of the ceramic employed, i.e. within a range of about 25 percent of the ceramic's coefficient of expansion, more preferably within about 15 percent. Preferred alloys include nickel-iron-chromium alloys having the following limiting chemical composition:

| Element | Percent | Element | Percent |
|---|---|---|---|
| Nickel | 30.0–35.0 | Silicon | 1.0 max. |
| Iron | 39.5 min. | Copper | 0.75 max. |
| Chromium | 19.0–23.0 | Aluminum | 0.15–0.60 |
| Carbon | 0.06–0.10 | Titanium | 0.15–0.60 |
| Manganese | 1.50 max. | Al + Ti | 0.85–1.20 |
| Sulfur | 0.015 max. | | |

Alloys having such chemical composition are commercially available under the names INCOLY alloy 800 and INCOLY alloy 800HT.

Porous metal products are made by compacting and sintering (heating), and by other well known methods (See, for example, Kirk-Othmer *Encyclopedia of Chemical Technology*, third edition, Vol. 19, pages 28 to 61, John Wiley & Sons, Inc. 1982). In porous materials, the void space that determines the porosity is controlled as to amount, type, and degree of interconnection. When in contact with gases containing oxygen and/or organic compounds over a long period of time at elevated temperatures, suitable porous supports advantageously and preferably remain rigid, do not change porosity and are resistant to corrosion reactions such as oxidation and carbonization. Chromium in the alloy promotes formation of a protective surface oxide, and nickel provides good retention of the protective coating, especially during cyclic exposure to high temperatures.

The oxygen ion-conducting ceramic membrane provides a gas-tight partition between the outer porous tube and the inner porous tube of hollow tube module wherein the ceramic is impervious to the components of the oxygen-containing gaseous mixture at ambient temperature. When an oxygen-containing gaseous mixture having a suitably high partial pressure of oxygen, i.e., in a range upward from about 0.2 atm., is applied to a dense ceramic membrane of this type (through the outer porous tube), oxygen will adsorb and dissociate on the surface, become ionized and diffuse through the ceramic to the other side and deionize, associate and desorb as separated oxygen into another gaseous mixture (through the inner porous tube) having a partial pressure of oxygen lower than that applied to the outer surface. The necessary circuit of electrons to supply this ionization/deionization process is, advantageously, maintained internally in the oxide via its electronic conductivity.

Oxygen-containing gaseous mixtures suitable as feed streams to the present process typically contain between about 10 mole percent to 50 mole percent oxygen. Water, carbon dioxide, nitrogen and/or other gaseous components are typically present in feed mixtures. A preferred oxygen-containing gaseous mixture is atmospheric air. Volatile hydrocarbons which are converted to carbon dioxide and water under operating conditions of the process may be included in small amounts without causing adverse effect on the separation process. Representative of such hydrocarbons are linear and branched alkanes, alkenes and alkynes having from 1 to about 8 carbon atoms.

A difference in partial pressure of oxygen between the first and second zones, i.e., across the membrane, provides the driving force for separation of oxygen from an oxygen-containing gaseous mixture at process temperatures sufficient to cause oxygen in the first zone to adsorb, become ionized on the first surface and be transported through the ceramic membrane in ionic form toward the second surface of the ceramic membrane and the second zone where partial pressure of oxygen is lower than the first zone. Transported oxygen is collected and/or reacted in the second zone wherein ionic oxygen is converted into neutral form by release of electrons at the second surface.

An excess partial pressure of oxygen in the first zone over that in the second zone (positive oxygen partial pressure difference) can be created by compressing the gaseous mixture in the first zone to a pressure sufficient to recover transported oxygen, i.e., an oxygen permeate stream, at a pressure greater than or equal to about one atmosphere. Typical feed pressures are in a range of from about 15 psia to about 250 psia, depending largely upon the amount of oxygen in the feed mixture. Conventional compressors can be utilized to achieve the compression required to practice the present process.

Alternatively, a positive oxygen partial pressure difference between the first and second zones can be achieved by reaction of transported oxygen with an oxygen-consuming substance, such as a volatile organic compound, to form value added oxygen-containing products and/or by mechanical evacuation of the second zone to a pressure sufficient to recover transported oxygen. Advantageously, a gaseous mixture containing organic compounds such as methane, ethane, and other light hydrocarbon gases, for example natural gas under well-head pressures of several hundred psi, is fed into the second zone wherein at least one of the compounds reacts with the oxygen transferred into the zone to form value added oxidation products.

Oxygen-containing gas steams which flow across the first surface of dense ceramic membranes in gas separation apparatus of this invention can be air, pure oxygen, or any other gas containing at least about 1 mol percent free oxygen. In another embodiment, the oxygen-containing gas stream contains oxygen in other forms such as $N_2O$, NO, $SO_2$, $SO_3$, steam ($H_2O$), $CO_2$, etc. Preferably, the oxygen-containing gas steam contains at least about 1 mol percent free molecular oxygen (dioxygen) and, more preferably, the oxygen-containing gas steam is air.

As mentioned above, processes according to the present invention include processes for preparing synthesis gas by reacting oxygen from an oxygen-containing gas stream with a hydrocarbyl compound in another gas stream without contaminating the hydrocarbyl compound and/or products of oxidation with other gases from the oxygen-containing gas stream, such as nitrogen from an air stream. Synthesis gas, a mixture of carbon monoxide (CO) and molecular hydrogen ($H_2$), is a valuable industrial feedstock for the manufacture of a variety of useful chemicals. For example, synthesis gas can be used to prepare methanol or acetic acid. Synthesis gas can also be used to prepare higher molecular weight alcohols or aldehydes as well as higher molecular weight hydrocarbons. Synthesis gas produced by the partial oxidation of methane, for example, is an exothermic reaction and produces synthesis gas having a useful ratio of hydrogen to carbon monoxide, according to the following equation:

$$CH_4 + 1/2 O_2 \rightarrow 2H_2 + CO$$

Preferred embodiments include processes for preparing synthesis gas by partial oxidation of any vaporizable hydrocarbyl compound. Hydrocarbyl compound used in processes of this invention suitably comprises one or more gaseous or vaporizable compounds that can be reacted with molecular oxygen or carbon dioxide to form synthesis gas. Most suitably, the hydrocarbyl compound is a hydrocarbon such as methane and/or ethane, however, various amounts of oxygen or other atoms can also be in the hydrocarbyl molecule. For example, hydrocarbyl compounds that can be converted to synthesis gas include methanol, dimethyl ether, ethylene oxide, and the like. However, the most preferable hydrocarbyl compounds are the low molecular weight hydrocarbons containing about 1 to about 20 carbons, more preferably 1 to about 10 carbon atoms. Methane, natural gas (which is mainly methane) or other light hydrocarbon mixtures which are readily available and inexpensive, are particularly preferred hydrocarbyl feed materials for processes of this invention. The natural gas can be either wellhead natural gas or processed natural gas. Composition of processed natural gas varies with the needs of the ultimate user. A typical processed natural gas composition contains, on a dry or water free basis, about 70 percent by weight of methane, about 10 percent by weight of ethane, 10 to 15 percent of $CO_2$, and the balance is made up of smaller amounts of propane, butane and nitrogen. Preferred hydrocarbyl feed materials also contain water at levels of about 15 percent which levels are useful to quench heat of any oxidation reactions. Mixtures of hydrocarbyl and/or hydrocarbon compounds can also be used.

PREFERRED EMBODIMENTS OF THE INVENTION

FIG. 1 illustrates apparatus for demonstrating aspects of a hollow tube module for membrane reactors using composite material comprising oxygen ion-conducting dense ceramic according to the present invention. As depicted in partial sectional view, a device in accordance with this invention comprises a base fixture 14 to which an inner porous metallic tube 15 and an outer porous metallic tube 16 are attached, advantageously, by welding. The porous metallic tubes are sized and disposed to provide an annular cavity for forming and supporting a gas-tight ceramic 28 comprising a crystalline mixed metal oxide composition. The device is provided with a cylindrical die 18 which is closely sized to the gas-tight ceramic 28, bolt 12, nut 22, washer 24 and spring 26. During formation of composite materials of the invention at elevated temperatures, force is applied to particulate precursors of any desired ceramic by spring 26, which is, advantageously, in a region of low temperature.

Other suitable methods for forming the supported gas-tight ceramic include dip coating, chemical vapor deposition, sputtering or thermal spraying. Target thickness of the ceramic is a controlling factor in selecting a means of applying a precursor of the desired ceramic membrane which, at high temperatures, is permeable to oxygen ions, but not other ions. Determinants of target thickness depend upon the inverse relationship of membrane thickness to oxygen ion permeability and mechanical stability of the composite material at operating temperature, among others. Generally, un-supported ceramic membranes ranging in thicknesses from about 0.5 to about 1.0 millimeters provide good oxygen ion permeability, but limited useful life under operating conditions. Advantageously, suitable target thickness of the ceramic in composite materials of the invention range upward from about 30 to about 600 microns, preferably from about 50 to about 500 microns.

Advantageously, composite materials of the invention are made from mixed metal oxide in a particulate form by spraying particulate oxide at elevated temperatures against the porous support, preferably by small particle plasma spraying, whereby the chemical interaction defining the interfacial zone is obtained. Initially, in the small particle plasma process, a fine agglomerate is sieved to achieve a powder having suitable mean diameter. Typically, this continuous procedure consists of melting particulate material in an electric arc, propelling, by means of a carrier gas, the melted material onto steel support where rapid cooling of the spray forms the supported membrane. Carrier gas, including, but not limited to, nitrogen, argon, hydrogen or a combination thereof, carries the powder first to the arc to create the plasma. This plasma is situated so that the porous substrate serves as a backstop. When coating non-flat surfaces, such as irregular cavities or tubes, the non-flat surface is turned on a lathe to assure uniform plasma coating.

Suitable porous metallic materials must have coefficients of thermal expansion not too different from that of the ceramic at operating temperatures, preferably within about 10 percent of the ceramic's coefficient of thermal expansion. Useful porous metallic materials comprise, typically, an alloy of at least two metallic elements which exhibits mechanical stability at operating temperature.

In a cross-sectional view perpendicular to the section of FIG. 1, the gas-tight ceramic can have any closed geometric form, which is, preferably, selected from circular, square or rectangular, and is, more preferably, circular. Preferred hollow tube modules for membrane reactors of this invention comprise dense ceramic membrane and porous metallic tubes which form concentric cylinders.

While we have described a present preferred embodiment of the invention, it is to be distinctly understood that the invention is not limited thereto, but may be otherwise embodied and practiced within the scope of the following claims.

EXAMPLES OF THE INVENTION

The following Examples will serve to illustrate certain specific embodiments of the herein disclosed invention. These Examples should not, however, be construed as limiting the scope of the novel invention as there are many variations which may be made thereon without departing from the spirit of the disclosed invention, as those of skill in the art will recognize.

EXAMPLE 1

This example demonstrates preparation of a hollow tube module using apparatus depicted in FIG. 1 porous tubes of 316 stainless steel alloy having outer diameters (OD) of ¼" and ½" and 5 µm pore size.

The annular cavity between the coaxially disposed tubes (about 3" long) was loaded with particulate precursors of a desired ceramic comprising a fine agglomerate having stoichiometry $Sr\ Fe\ Co_{0.5}\ O_8$, but not yet formed into a single crystalline phase. This agglomerate was purchased to specification from Praxair Specialty Ceramics of Seattle, Wash. The entire apparatus was placed in a closed alumina tube (1" OD) which was then evacuated by means of a vacuum pump. The alumina tube containing the apparatus was inserted into a furnace which was heated at a rate of 5° C. per minute to 1000° C., held at 1000° C. for 2 days and cooled a rate of 5° C. per minute under vacuum. A diamond saw was used to cross section the resulting composite material into thin discs for analysis.

Figure 2:
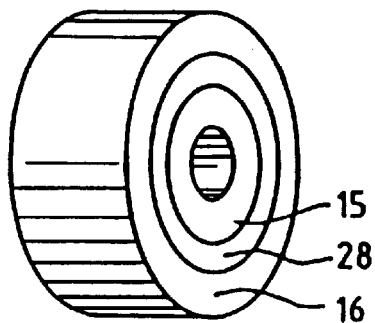
FIG. 2 is a perspective view of a disc sectioned from apparatus depicted in FIG. 1.
Figure 3:
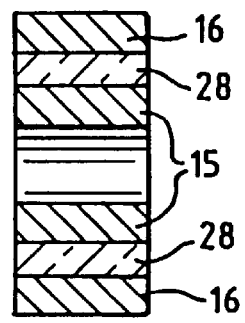
FIG. 3 is a cross-sectional view of the disc depicted in FIG. 2.

FIG. 2 is a perspective view of a disc sectioned from apparatus. A first interfacial zone was formed between the inner porous tube 15 and ceramic 28 having, across the interfacial zone, a gradient of composition. Likewise, a second interfacial zone was formed between the ceramic 28 and the outer porous tube 16.

Chemistry across these interfacial zones was studied by electron microscopy. One of the discs was embedded in ethylmethacrylate resin. A polished cross section was prepared using standard metallographic techniques and the polished cross section was coated with carbon by vacuum evaporation. A scanning electron microscope (SEM) was operated in the backscattered electron imaging mode (BSEI), which shows, primarily, compositional contrast (higher atomic number compositions are brighter). Energy-dispersive X-ray spectrometry (EDXS) analysis was done in the SEM with the electron probe scanning a field, identified "F", a partial field, identified "PF", or a stationary probe on a spot, identified "S". SEM/FDXS analysis can detect all elements boron and heavier. The evaporated carbon coating makes a minor contribution to the C signals in the spectra. Elemental distributions across the stainless steel/ceramic interface were determined by obtaining linescan profiles for O, Sr, Cr, Fe, Co, and Ni.

Figure 4:
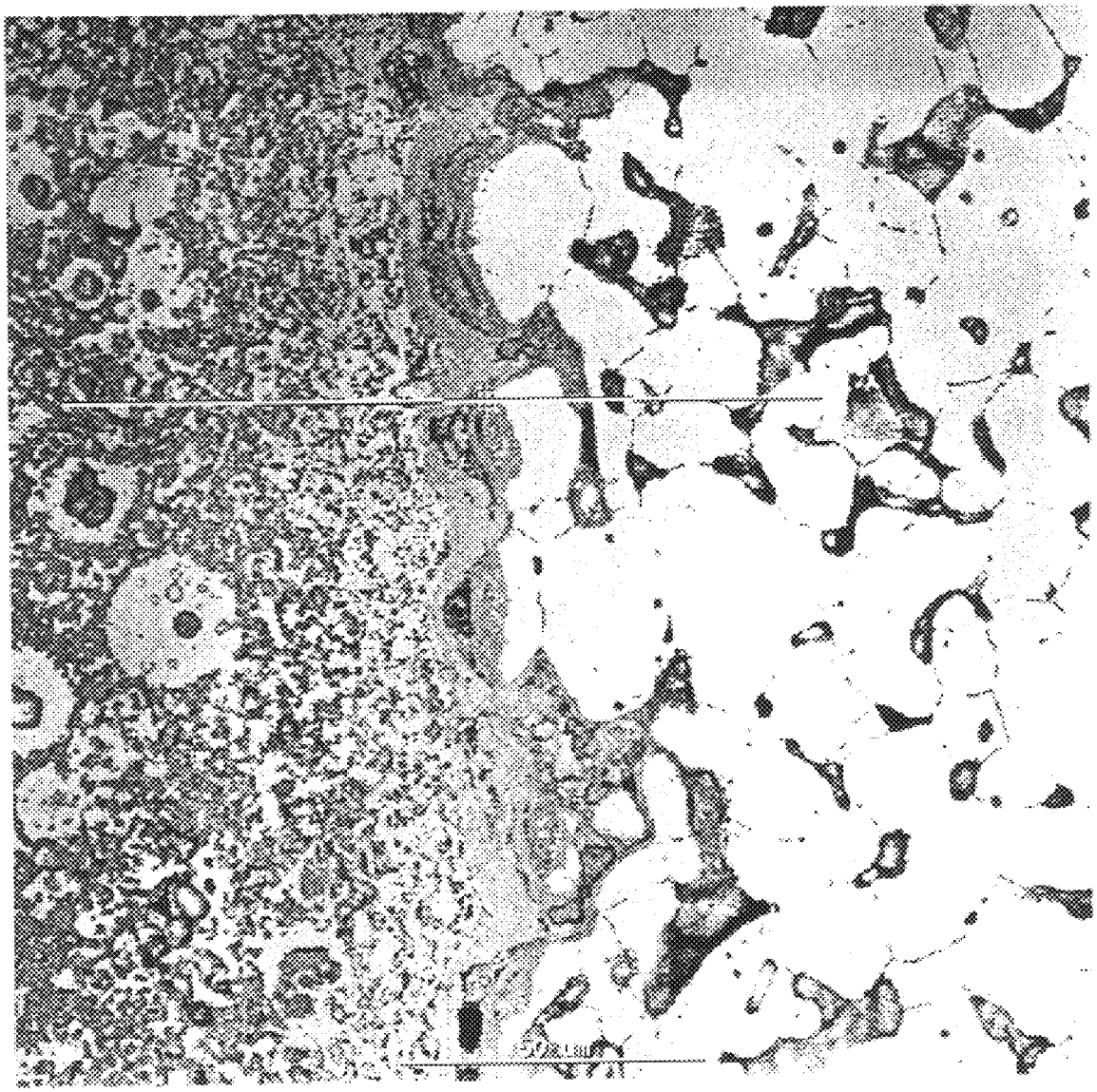
FIG. 4 is a digital image, from a scanning electron microscope, showing position for linescan analysis across regions of mixed metal oxide, porous metallic support, and interfacial zone therebetween.
Figure 5A:
FIG. 5 is a graphical presentation of linescan analysis data at the position shown in FIG. 4.
Figure 5B:
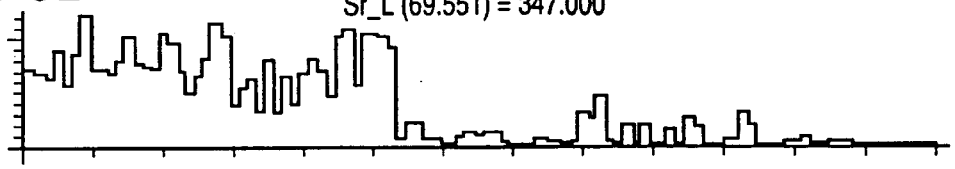
Figure 5C:
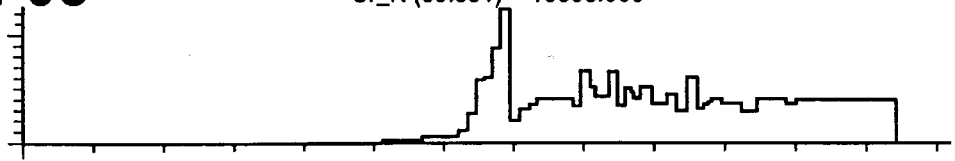
Figure 5D:
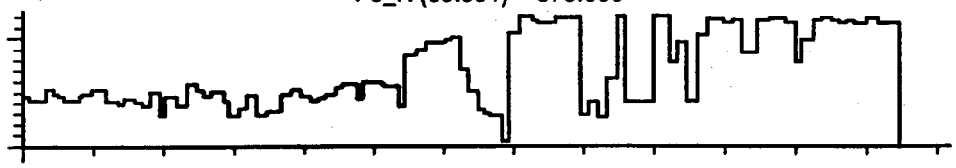
Figure 5E:
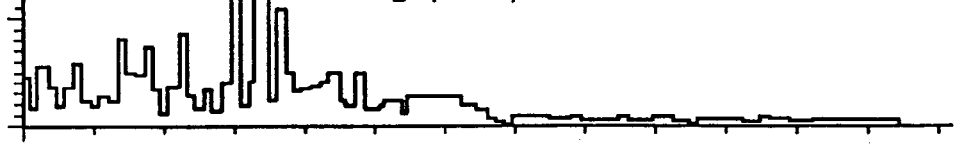
Figure 5F:
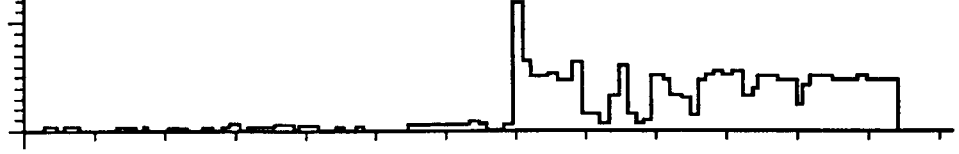

FIG. 4 is a digital image, from a scanning electron microscope, showing position for linescan analysis across regions of mixed metal oxide, porous metallic support, and interfacial zone therebetween. Ceramic is on the left side and porous steel is on the right.

The interfacial zone, which is about 10 $\mu$m thick, appears to be two layers—the BSEI-brighter layer (ceramic side) appears to have a uniform, dense composition, and the BSEI-darker layer (steel side) appears porous and more complex. The linescan covered about 125 $\mu$m (see FIG. 5 which is a graphical presentation of linescan analysis data at the position shown in FIG. 4). The digital BSEI image has a horizontal line which shows the location of the linescan (100 analysis points from one end point to the other), and the cross-hair marker on each linescan corresponds to the position of the vertical line on each corresponding elemental linescan profile. As shown, the cross hair is at the boundary between the interfacial zone and the stainless steel.

The line scan extends from a region of ceramic on the left through an interfacial zone (about 5 $\mu$m), and steel with two pores on the right (about 5 $\mu$m and about 15 $\mu$m from the cross-hair marker). The 5 $\mu$m distance is close enough to the ceramic that the surface of the pore is coated with a Sr—Cr—O species, while the more distant pore (15 $\mu$m) exhibits a Sr—O species. The regions of steel have characteristics of the alloy with the Ni concentration increasing at the interface. Ni concentration drops because of the Sr—Cr oxide crust on the surface in the pores. The interfacial zone is predominately a Cr—Fe—O system with Cr higher at the right side of the interfacial zone. An inverse relationship between the Cr and Fe appears in the region.

Some observations which can be made from these linescan data are as follows: (1) the ceramic appears to have a fairly uniform Sr—Fe—Co—O composition, except that the Co level appears to vary significantly; (2) the steel has a uniform Fe—Cr—Ni—Mo composition, except that the Mo and Ni levels rise over the last couple micrometers up to the interfacial zone boundary; (3) the ceramic side of the interfacial zone is rich in O, Fe, and Co, whereas the stainless steel side of the interfacial zone is rich in O and Cr and some Mo; (4) there appears to be very little Sr in the interfacial zone, but some is observed in pores within the stainless steel layer; (5) although part of the carbon signal is from the evaporated carbon coating, there appears to be slightly more carbon in the ceramic than in the stainless steel, and even more carbon in the interfacial zone.

EXAMPLE 2

This example demonstrates preparation of a hollow tube module with a dense ceramic membrane made from a crystalline mixed metal oxide by thermal spraying of particulate oxide against the outer surface of a porous tubular support.

A porous tubular support with outer diameters (OD) of ½ inch was fabricated from a steel alloy (Incolloy 800 HT or Haynes 230). Solid (i.e., non-porous) tubes of the same steel alloy were attached to each end of a 3 inch length of the porous support to form a support for the module. Particulate precursor of the desired ceramic membrane was a fine agglomerate having stoichiometry $Sr\ Fe\ Co_{0.5}\ O_\delta$, which had been sieved to achieve a powder mean diameter of 7.7 microns, with a median diameter of 7.3 microns. This agglomerate was prepared to this specification by Praxair Specialty Ceramics of Seattle, Wash.

A dense ceramic membrane having a nominal thickness of about 300 $\mu$m (0.3 mm) was applied to the outer surface of the support using small particle plasma spraying, also referred to as thermal spraying, by the Advanced Coating Technology Group of Northwestern University in Evanston, Ill. Other providers of suitable thermal spraying technology may be used. Typically, this continuous procedure consists of melting particulate material in a heating zone, propelling, by means of a carrier gas, the melted material onto steel support where rapid cooling of the spray forms the supported membrane.

The porous tube module was positioned approximately 5 cm from the spray gun and rotated during the spray process. While the porous tube was not heated prior to being sprayed, such pre-heating also produces suitable results. The carrier gas was a nitrogen/hydrogen gas mixture. Spraying covered the entire porous surface and also approximately 1 cm of each solid tubes contiguous to the porous surface. After spraying, the module was annealed in a flowing nitrogen atmosphere at approximately 1000° C. Using inert gas, the module was tested up to differential pressures of about 100 psi without failure.

EXAMPLE 3

This example includes demonstrations of methane conversion to syngas using a hollow tube module. A module, prepared as in Example 2, was positioned within a shell adapted for flow of air over the membrane during the conversion process.

About 3 mL of hydrotalcite based catalyst containing 1 percent rhodium and 4 percent cobalt was charged to the module. A stream of methane was fed into the module. Flow rates of the methane and air were in the range of 50 to 200 mL/min. At reaction temperatures between 900° C. and 975° C., oxygen was separated from air by the ceramic membrane, and the separated oxygen reacted with methane to produce syngas. Conversions of methane to the desired products were over and above 40 percent.

EXAMPLE 4

After demonstration of methane conversion to syngas using the hollow tube module, as described in Example 3, at differential pressures up to about 50 psi, differential pressure was increased under conversion conditions. The composite material failed at differential pressure of about 56 psi. A section, about 1 cm long, was cut from the middle of the tube with a diamond wafer saw, embedded in a fast-setting acrylic resin, polished, and coated with carbon, by vacuum evaporation, for analysis.

An interfacial zone between the thin dense ceramic membrane and the inner porous tube was identified by use of a scanning electron microscopy. Taking the outer Sr—Co—Fe ceramic as reference, the interfacial zone had lower levels of Sr, Cr, and Co, but higher levels of Fe and Ni. The porous support contained spheres of Fe—Ni—Cr alloy ranging in size from about 5 to 60 μm in diameter, but only the smaller ones had started to fuse with other spheres.

For the purposes of the present invention, "predominantly" is defined as more than about fifty per cent. "Substantially" is defined as occurring with sufficient frequency or being present in such proportions as to measurably affect macroscopic properties of an associated compound or system. Where the frequency or proportion for such impact is not clear, substantially is to be regarded as about twenty per cent or more. The term "essentially" is defined as absolutely except that small variations which have no more than a negligible effect on macroscopic qualities and final outcome are permitted, typically up to about one percent.

Examples have been presented and hypotheses advanced herein in order to better communicate certain facets of the invention. The scope of the invention is determined solely by the scope of the appended claims.

That which is claimed is:

1. A process to convert organic compounds into value-added products, which process comprises:

providing a membrane reactor comprising inlet and outlet manifolds which are in flow communication with one another through a plurality of hollow tube modules comprising (i) a dense ceramic membrane comprising a crystalline mixed metal oxide which exhibits, at operating temperatures, electron conductivity, oxygen ion conductivity, and ability to separate oxygen from a gaseous mixture containing oxygen and one or more other components by means of the conductivities; (ii) a tubular, porous support for the membrane comprising an alloy of at least two metallic elements which tubular support exhibits mechanical stability at the operating temperatures; and (iii) an interfacial zone of at least about 5 μm which exhibits a gradient of composition across the interfacial zone in at least one metallic element;

contacting the dense ceramic membrane of the hollow tube modules with a dioxygen-containing gaseous mixture;

flowing a gaseous stream comprising one or more organic compounds through the plurality of the hollow tube modules;

permitting oxygen to be transported through the dense ceramic membrane into the hollow tube modules by means of its electron conductivity and oxygen ion conductivity, thereby separating oxygen from the dioxygen-containing gaseous mixture; and reacting at least one of the organic compounds with the oxygen transported through the membrane to form oxidation products at temperatures in a range from about 500° C. to about 1150° C.

2. The process according to claim 1 wherein the gaseous stream flowing through the hollow tube modules is maintained at pressures in a range upward from total pressure of the dioxygen-containing gaseous mixture in a zone surrounding the hollow tube modules.

3. The process according to claim 1 wherein the dense ceramic membrane permeable to oxygen comprises the crystalline mixed metal oxide composition represented by $SrFeCo_{0.5}O_\delta$, where δ is a number which renders the compound charge neutral, and wherein the composition has a powder X-ray diffraction pattern comprising significant lines substantially as described in

TABLE I

Principal XRD Lines

| Interplanar Spacing d, Å | Assigned Strength |
|---|---|
| 9.52 ± .05 | Weak |
| 3.17 ± .05 | Weak |
| 2.77 ± .05 | Medium–Strong |
| 2.76 ± .05 | Medium–Strong |
| 2.73 ± .03 | Very Strong |
| 2.08 ± .03 | Weak–Medium |
| 1.96 ± .02 | Medium |
| 1.90 ± .02 | Weak–Medium |
| 1.592 ± .01 | Weak–Medium |
| 1.587 ± .01 | Medium |
| 1.566 ± .01 | Weak. |

4. The process according to claim 3 wherein a differential pressure across the dense ceramic membrane of the hollow tube modules is maintained at pressures in a range downward from about 100 psi.

5. The process according to claim 3 wherein the dense ceramic membrane is made from the crystalline mixed metal oxide in a particulate form by spraying particulate oxide at temperatures in a range upward from about 500° C. against, at least, the outer surface of the porous tubular support.

6. The process according to claim 1 wherein the crystalline mixed metal oxide composition is selected from a class of materials which have an X-ray identifiable crystalline structure based upon the structure of model perovskite mineral, $CaTiO_3$.

7. The process according to claim 6 wherein the dense ceramic membrane is made from the crystalline mixed metal oxide in a particulate form by spraying particulate oxide at temperatures in a range upward from about 500° C. against, at least, the outer surface of the porous tubular support.

8. The process according to claim 1 wherein the crystalline mixed metal oxide composition is represented by $D_\alpha E_{\alpha+\beta} O_\delta$ where D comprises at least one metal selected from the group consisting of magnesium, calcium, strontium, and barium, E comprises at least one element selected from the group consisting of vanadium, chromium, manganese, iron, cobalt, and nickel, α is a number in a range from about 1 to about 4, β is a number in a range from about 0.1 to about 20, such that $1.1 < (\alpha+\beta)/\alpha \leq 6$, and δ is a number which renders the compound charge neutral, wherein the crystalline mixed metal oxide composition has a crystalline structure comprising layers having a perovskite structure held apart by bridging layers having a different structure identifiable by means of powder X-ray diffraction pattern analysis, the composition such that a dense ceramic membrane comprising the composition exhibits electron conductivity and oxygen ion conductivity, and ability to separate oxygen from a gaseous mixture containing oxygen and one or more other volatile components by means of the conductivities.

9. The process according to claim 8 wherein the dense ceramic membrane is made from the crystalline mixed metal oxide in a particulate form by spraying particulate oxide at temperatures in a range upward from about 500° C. against, at least, the outer surface of the porous tubular support.

10. The process according to claim 1 wherein the crystalline mixed metal oxide composition is represented by $$(D_{1-y}M'_y)_\alpha(E_{1-x}G_x)_{\alpha+\beta}O_\delta$$

where D is a metal selected from the group consisting of magnesium, calcium, strontium, and barium, M' is a metal selected from the group consisting of magnesium, calcium, strontium, barium, copper, zinc, silver, cadmium, gold, and mercury, E is an element selected from the group consisting of vanadium, chromium, manganese, iron, cobalt, and nickel, G is an element selected from the group consisting of vanadium, chromium, manganese, iron, cobalt, nickel, niobium, molybdenum, technetium, ruthenium, rhodium, palladium, indium, tin, antimony, rhenium, lead, and bismuth, with the proviso that D, E, G and M' are different elements, y is a number in a range from about 0.1 to about 0.5, x is a number in a range from about 0.1 to about 0.8, $\alpha$ is a number in a range from about 1 to about 4, $\beta$ is a number in a range from 0.1 to about 20, such that $$1.1 < (\alpha+\beta)/\alpha \leq 6,$$

and $\delta$ is a number which renders the compound charge neutral, wherein the crystalline mixed metal oxide composition has a crystalline structure comprising layers having a perovskite structure held apart by bridging layers having a different structure identifiable by means of powder X-ray diffraction pattern analysis, the composition such that a dense ceramic membrane comprising the composition exhibits electron conductivity and oxygen ion conductivity, and ability to separate oxygen from a gaseous mixture containing oxygen and one or more other volatile components by means of the conductivities.

11. The process according to claim 10 wherein $\beta$ is a number in a range from about 0.1 to about 6.

12. The process according to claim 11 wherein the dense ceramic membrane is made from the crystalline mixed metal oxide in a particulate form by spraying particulate oxide at temperatures in a range upward from about 500° C. against, at least, the outer surface of the porous tubular support.

13. The process according to claim 1 wherein the crystalline mixed metal oxide composition is represented by $$Sr_\alpha(Fe_{1-x}Co_x)_{\alpha+\beta}O_\delta$$

where x is a number in a range from 0.01 to about 1, $\alpha$ is a number in a range from about 1 to about 4, $\beta$ is a number in a range from about 0.1 to about 20, such that $$1 < (\alpha+\beta)/\alpha \leq 6,$$

and $\delta$ is a number which renders the compound charge neutral, and wherein the crystalline mixed metal oxide composition has a crystalline structure comprising layers having a perovskite structure held apart by bridging layers having a different structure identifiable by means of powder X-ray diffraction pattern analysis, the composition such that a dense ceramic membrane comprising the composition exhibits electron conductivity and oxygen ion conductivity, and ability to separate oxygen from a gaseous mixture containing oxygen and one or more other volatile components by means of the conductivities.

14. The process according to claim 13 wherein the dense ceramic membrane is made from the crystalline mixed metal oxide in a particulate form by spraying particulate oxide at temperatures in a range upward from about 500° C. against, at least, the outer surface of the porous tubular support.

15. The process according to claim 1 wherein the crystalline mixed metal oxide composition is represented by $$(Sr_{1-Y}M_Y)_\alpha(Fe_{1-x}Co_x)_{\alpha+\beta}O_\delta$$

where and M is an element selected from the group consisting of yttrium, barium, and lanthanum, X is a number in a range from about 0.01 to about 0.95, Y is a number in a range from about 0.01 to about 0.95, $\alpha$ is a number in a range from about 1 to about 4, $\beta$ is a number in a range from about 0.1 to about 20, such that $$1.1 < (\alpha+\beta)/\alpha \leq 6,$$

and $\delta$ is a number which renders the compound charge neutral, wherein the crystalline mixed metal oxide composition has a crystalline structure comprising layers having a perovskite structure held apart by bridging layers having a different structure identifiable by means of powder X-ray diffraction pattern analysis, the composition such that a dense ceramic membrane comprising the composition exhibits electron conductivity and oxygen ion conductivity, and ability to separate oxygen from a gaseous mixture containing oxygen and one or more other volatile components by means of the conductivities.

16. The process according to claim 15 wherein X is a number in a range from 0.1 to 0.8, Y is a number in a range upward from 0.1 to about 0.5, and $\beta$ is a number in a range from about 0.1 to about 6.

17. The process according to claim 16 wherein the dense ceramic membrane is made from the crystalline mixed metal oxide in a particulate form by spraying particulate oxide at temperatures in a range upward from about 500° C. against, at least, the outer surface of the porous tubular support.

* * * * *

UNITED STATES PATENT AND TRADEMARK OFFICE
CERTIFICATE OF CORRECTION

PATENT NO. : 6,293,978 B1
DATED : September 25, 2001
INVENTOR(S) : Mark S. Kleefisch, Carl A. Udovich, Joseph G. Masin and Thaddeus P. Kobaylinski It is certified that error appears in the above-identified patent and that said Letters Patent is hereby corrected as shown below:

Column 8,
Line 46, "$(D_{1-y}{}^1{}_y) \propto (E_{1-x}G_x)_{\propto+\beta}O_\delta$" should read -- $D_{1-y}M^1{}_y)\propto(E_{1-x}G_x)_{\propto+\beta}O_\delta$ --

Column 11,
Line 19, "alloy 800IIT." should read -- alloy 800HT. --

Column 12,
Line 39, "steam (II$_2$O)," should read -- steam (H$_2$O), --

Column 15,
Line 3, "ethylmethacrylate resin." should read -- methylmethacrylate resin. --
Line 12, "SEM/FDXS analysis can" should read -- SEM/EDXS analysis can --

Column 19,
Line 44, "$Sr_\propto (Fe_{1\ x}Co_x)\propto^1{}_\beta O_\delta$" should read -- $Sr_\propto (Fe_{1-x}Co_x)_{\propto+\beta}O_\delta$ --

Signed and Sealed this

Sixteenth Day of April, 2002

*Attest:*

JAMES E. ROGAN
*Attesting Officer*  *Director of the United States Patent and Trademark Office*